(12) United States Patent
Tjensvold et al.

(10) Patent No.: US 7,409,698 B2
(45) Date of Patent: Aug. 5, 2008

(54) OPTICAL DISC CASE USABLE IN PLAYER WITH DISC ENCASED THEREIN

(76) Inventors: Mark Tjensvold, PO Box 2671, Gillette, WY (US) 82716; Mike Tjensvold, 26217 NE. 45th Ave., Ridgefield, WA (US) 98642

( * ) Notice: Subject to any disclaimer, the term of this patent is extended or adjusted under 35 U.S.C. 154(b) by 355 days.

(21) Appl. No.: 11/251,233

(22) Filed: Oct. 15, 2005

(65) Prior Publication Data

US 2007/0089120 A1    Apr. 19, 2007

(51) Int. Cl.
G11B 23/03    (2006.01)
(52) U.S. Cl. .................................. 720/719; 720/736
(58) Field of Classification Search ............... 720/719, 720/724, 725, 736; 369/291.1
See application file for complete search history.

(56) References Cited

U.S. PATENT DOCUMENTS

| | | | | |
|---|---|---|---|---|
| 3,854,729 A * | 12/1974 | Downs | .................. | 369/272.1 |
| 3,961,656 A * | 6/1976 | Aggarwal | .................. | 206/309 |
| 4,535,434 A * | 8/1985 | Kishi | .................. | 369/111 |
| 4,536,868 A * | 8/1985 | Lange et al. | .................. | 369/284 |
| 4,539,573 A * | 9/1985 | Marchant et al. | .................. | 346/137 |
| 4,551,733 A * | 11/1985 | Cornet et al. | .................. | 346/137 |
| 4,556,968 A * | 12/1985 | Pelkey et al. | .................. | 369/287 |
| 4,561,086 A * | 12/1985 | Geyer | .................. | 369/100 |
| 5,293,370 A * | 3/1994 | Beauchamp et al. | .................. | 369/275.5 |
| 5,479,796 A * | 1/1996 | Shimano | .................. | 63/33 |
| 5,774,448 A * | 6/1998 | Shtipelman et al. | .................. | 720/719 |
| 5,787,069 A * | 7/1998 | Lowe et al. | .................. | 720/719 |
| 6,144,632 A * | 11/2000 | Burroughs | .................. | 720/719 |
| 6,192,025 B1 * | 2/2001 | Chen | .................. | 720/719 |
| 6,240,061 B1 * | 5/2001 | Burroughs | .................. | 720/719 |
| 6,243,356 B1 * | 6/2001 | Rubino, III | .................. | 720/734 |
| 6,249,509 B1 * | 6/2001 | Hirata et al. | .................. | 369/275.5 |
| 6,385,164 B1 * | 5/2002 | Winicki | .................. | 720/719 |
| 6,667,953 B2 * | 12/2003 | Matson et al. | .................. | 720/719 |
| 6,771,588 B2 * | 8/2004 | Poole et al. | .................. | 369/291.1 |
| 6,804,823 B2 * | 10/2004 | Poole et al. | .................. | 720/725 |
| 2003/0117937 A1 * | 6/2003 | Matson et al. | .................. | 369/291 |
| 2004/0055910 A1 * | 3/2004 | Boorman | .................. | 206/308.1 |
| 2005/0016878 A1 * | 1/2005 | Bergus et al. | .................. | 206/307 |
| 2005/0243703 A1 * | 11/2005 | Van Der Aa et al. | .................. | 369/275.5 |

FOREIGN PATENT DOCUMENTS

| | | | | |
|---|---|---|---|---|
| DE | 29614442 | U1 | * | 12/1996 |
| FR | 2576703 | A1 | * | 8/1986 |
| GB | 2333885 | A | * | 8/1999 |
| JP | 01211339 | A | * | 8/1989 |
| JP | 08295383 | A | * | 11/1996 |
| JP | 2001297485 | A | * | 10/2001 |
| WO | WO 9414161 | A1 | * | 6/1994 |
| WO | WO 9705609 | A1 | * | 2/1997 |
| WO | WO 0162628 | A1 | * | 8/2001 |

\* cited by examiner

*Primary Examiner*—William J Klimowicz
(74) *Attorney, Agent, or Firm*—Raymond M. Galasso; Galasso & Associates, LP

(57) ABSTRACT

A optical disc holder and protector designed to retain a disc and remain thereon when the disc is inserted into a standard disc player/recorder so as to maintain protection of the disc and allow the disc to be utilized in the player/recorder. The disc holder includes a bottom tray configured to receive a standard disc. An upper retaining flange is present contiguously integrated into an outer wall, the upper retaining flange downwardly biases an inserted disc onto a lower retaining flange peripherally disposed adjacent to the outer wall creating a barrier to dust and debris.

14 Claims, 3 Drawing Sheets

OPTICAL DISC CASE USABLE IN PLAYER WITH DISC ENCASED THEREIN

FIELD OF THE INVENTION

The present invention relates to an optical storage media protective device, more specifically but not by way of limitation, to a CD/DVD protection device that provides protection for the disc during storage and during use in a player/recorder.

BACKGROUND

With the proliferation of CD and DVD technology, the average consumer now has ten's if not hundreds of discs to manage. The difficulty in using the discs is in the area of disc management. The discs must be stored and then removed from their storage units, usually a standard jewel case made of polystyrene with a hinged cover, and placed in a desired player. Frequently, after normal use, the removing of the disc from its protective case to the player can result in permanent damage. Scratches to the disc, usually caused from dirt or dust accumulated on the disc renders the disc inoperable and must be replaced. It is highly beneficial to a user to keep the optical or information side of the disc free from all debris such as dust.

The damaged disc present several problems. First, as discs are used as backup devices in the information technology industry, the loss of crucial data can result in unfortunate circumstances. Another problem is the expense of the loss of data itself or the expense of the act of having to recover the data from another source and record it again on the disc.

Another problem for the individual consumer market is the cost of replacing the CD's or DVD's. With the average inventory of discs for the typical consumer being around a hundred discs, the cost of replacing damaged discs each year can be a significant expense.

Another problem in the area of disc management is that of shelf space. With the average jewel case being 1-2 cm in width, a slimmer storage case will allow storage of more encased discs per square inch of shelf space.

Accordingly, there is a need for a device that can protect the information containing side of CD's or DVD's from contamination of dust and debris without having to be removed from the device in order to use the enclosed disc in a standard CD/CVD player.

SUMMARY OF THE INVENTION

It is an object of the present invention to provide a disc storage case for a standard CD/DVD disc, more specifically a disc storage case with a CD/DVD encased therein that allows the user to use an encased CD or DVD in a standard CD/DVD player.

It is another object of the present invention to provide a one-sided case for the protection of the optical or information containing side of a CD/DVD disc from contamination such as dust or dirt.

A further object of the present invention to provide an alternative embodiment of a CD/DVD disc case that provides protection for both sides of the disc and the disc storage case with the CD/DVD contained therein can be used in a standard CD/DVD player.

Yet another object of the present invention is to provide a CD/DVD disc storage case that is compatible multiple with CD and DVD players to allow the disc storage case containing with a CD/DVD disc contained therein to be used in a standard CD/DVD player.

It is still another object of the present invention to provide a CD/DVD disc storage case that is manufactured from a polymer with reduced diffraction properties.

A further object of the present invention is to provide a CD/DVD disc storage case that is lightweight, durable and relatively thin.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
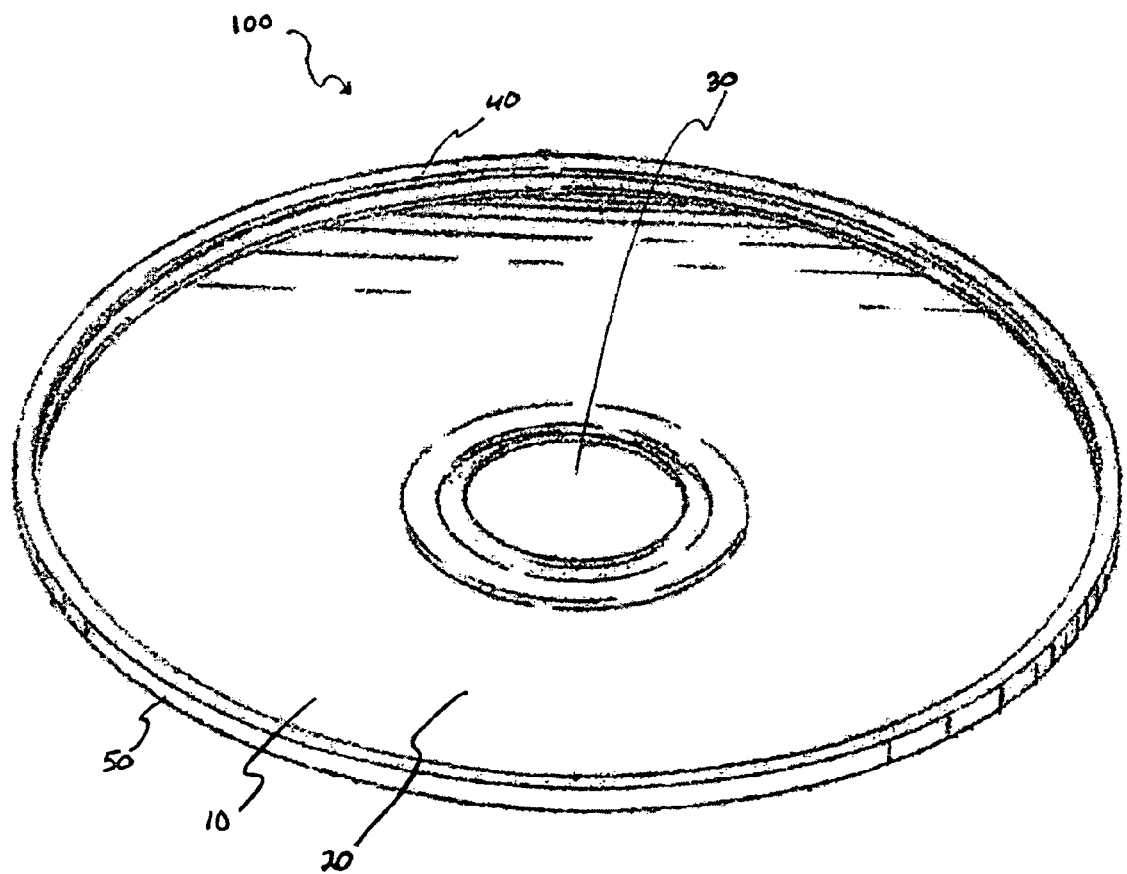
FIG. 1 is a perspective view of a single-sided embodiment of the present invention.
Figure 2:
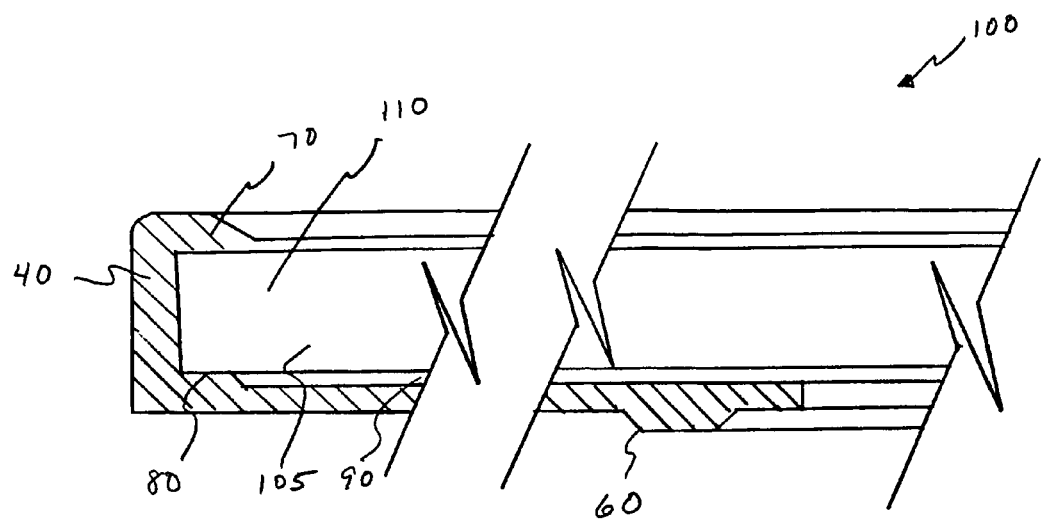
FIG. 2 is an enlarged partial cross-sectional view of the embodiment shown in FIG. 1.

Referring now to the drawings, wherein various elements depicted are not necessarily drawn to scale, and in particular FIGS. 1 and 2, there is illustrated a disc storage case 100 constructed according to the principles of the present invention.

The disc storage case 100 comprises a bottom tray 10 configured in a substantially planar manner having a disc resting surface 20. The bottom tray 10 is circular in shape with the disc resting surface 20 extending inwardly to a central opening 30. The diameter of the bottom tray 10 is approximately 0.04 inches greater than the diameter of the media to be inserted therein. It is contemplated within the scope of the present invention that while good results have been achieved with a bottom tray 10 of a diameter 0.04 inches greater than the diameter of the media to be inserted therein, such as a standard CD, those skilled in the art will recognize that numerous other diameters could be used to achieve the desired function herein.

The central opening 30 is circular in shape and of sufficient size to be larger than the standard opening of a disc. Although no specific measurements are required, a central opening 30 of approximately one inch has been shown to achieve good results. This measurement allows the disc retained in the disc storage case 100 to be inserted into a standard CD/DVD player and operate normally. Further, the measurement prevents interference with the disc and its engagement with a standard hub mechanism of a typical jewel storage case and the player. Those skilled in the art will recognize that numerous sizes of the central opening 30 could be used to achieve the function suggested herein. The central opening 30 should be of size so as not to create interference with the information containing area of a conventionally manufactured disc.

A standard disc of conventional construction typically has an information containing area and an adjacent non-information containing area along the outer edge 110 of the disc. The bottom tray 10 is designed to be relatively very thin. This facilitates the disc storage case 100 with a disc retained therein to be used normally in a standard CD/DVD player without disruption to the normal mechanisms in the player.

Although no specific measurements of the bottom tray 10 are required, good results have been shown to be achieved with a bottom tray 10 of approximately 0.02 inches in thickness. The bottom tray 10 is manufactured from durable plastic or other material. The bottom tray 10 must be manufactured from a group of plastics that exhibit low to no diffraction properties for the wavelength of the laser used to play the disc in standard players, as any diffraction of the laser beam will disrupt the operation of the player.

Those skilled in the art will recognize that a standard DVD player utilizes a laser that has a wavelength of approximately 650 nm. The wavelength for a laser in a standard CD player is approximately 780 nm. It is contemplated within the scope of the present invention that the bottom tray 10 would posses low diffraction of wavelengths between 600-800 nm. The bottom tray 10 should allow wavelengths of these approximate measurements to pass through with no diffraction in order to prevent interference with the performance of the CD/DVD player. It is contemplated within the scope of the present invention that the disc storage case 100 could be utilized in numerous devices. More specifically, but not by way of limitation, the disc storage case 100 having a disc encased therein could be used in computers, car stereos, home theater systems and portable game machines designed to utilize optical discs.

Proximate to the peripheral edge 50 of the bottom tray 10 and generally perpendicular to the bottom tray 10 is an outer wall 40. The outer wall 40 is contiguous with and extends upwardly from the bottom tray 10. The outer wall 40 is circumferentially disposed along the entire peripheral edge 50 of the bottom tray 10. The portion of the outer wall 40 distal to the bottom tray 10 is shaped to form an upper retaining flange 70. The upper retaining flange 70 protrudes inwardly toward the central opening 30 from the outer wall 40. Mounted opposite the upper retaining flange 70 adjacent to the outer wall 40 and inwardly protruding toward the central opening 30 is a lower retaining flange 80. The lower retaining flange 80 is generally rectangular in shape and is circumferentially disposed along the entire outer wall 40 and is contiguously mounted to the bottom tray 10. The lower retaining flange 80 is used to capture the disc 105 and suspend the disc superposed to the disc resting area 20. Upon placement of a disc 105 on the bottom tray 10, the upper retaining flange 70 downwardly biases the disc 105 against the lower retaining flange 80.

This biased position is specifically illustrated in FIG. 2. Once in a biased position, the disc 105 and the disc resting surface 20 form a lower void 90. The lower void 90 is impervious to dust and debris with the outer edge 110 of the disc 105 being downwardly biased by the upper retaining flange 80 onto the lower retaining flange 80. This configuration creates the ability for the disc storage case 100 to effectively encase the information containing side of the disc 105 and be transferred from storage to player in combination preventing damage from occurring to the disc 105. Although no specific measurements are required for the lower retaining flange 80, good results have been shown to be achieved with a lower retaining flange 80 that is 0.005 inches in width and 0.005 inches in height.

Now referring in particular to FIG. 2, a downwardly extending circular ridge 60 is formed on the under surface of the bottom tray 10. The circular ridge 60 is disposed about the central opening. The circular ridge 60 allows the disc storage case 100 to readily engage with a standard tray of a jewel case or CD/DVD player. The circular ridge 60 downwardly biases the disc storage case 100 when it is engaged with a standard tray of a jewel case and CD/DVD player. Although no specific measurement is required for the diameter of the circular ridge 60, good results have been shown to be achieved with a diameter that is equal to the central opening 30 as described herein.

Figure 4:
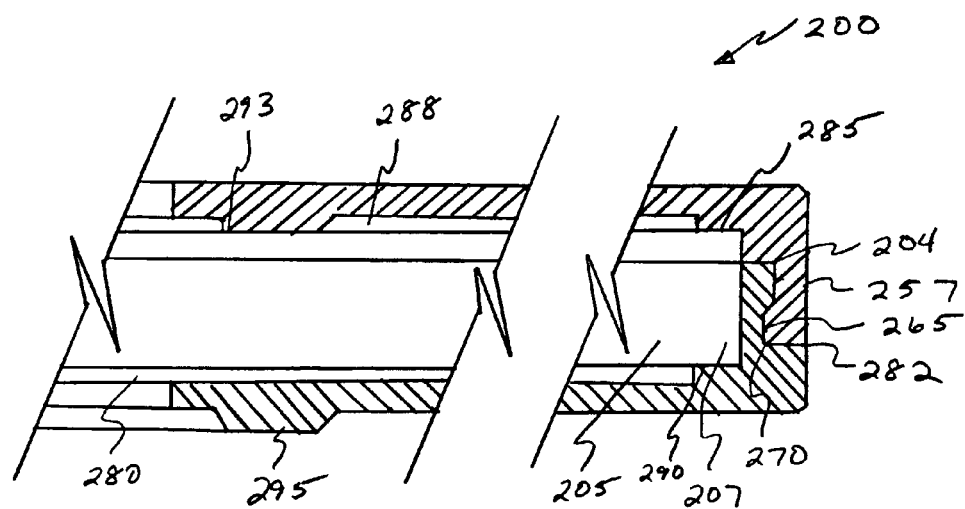
FIG. 4 is an enlarged assembled partial cross-sectional view of the embodiment of FIG. 3.
Figure 3:
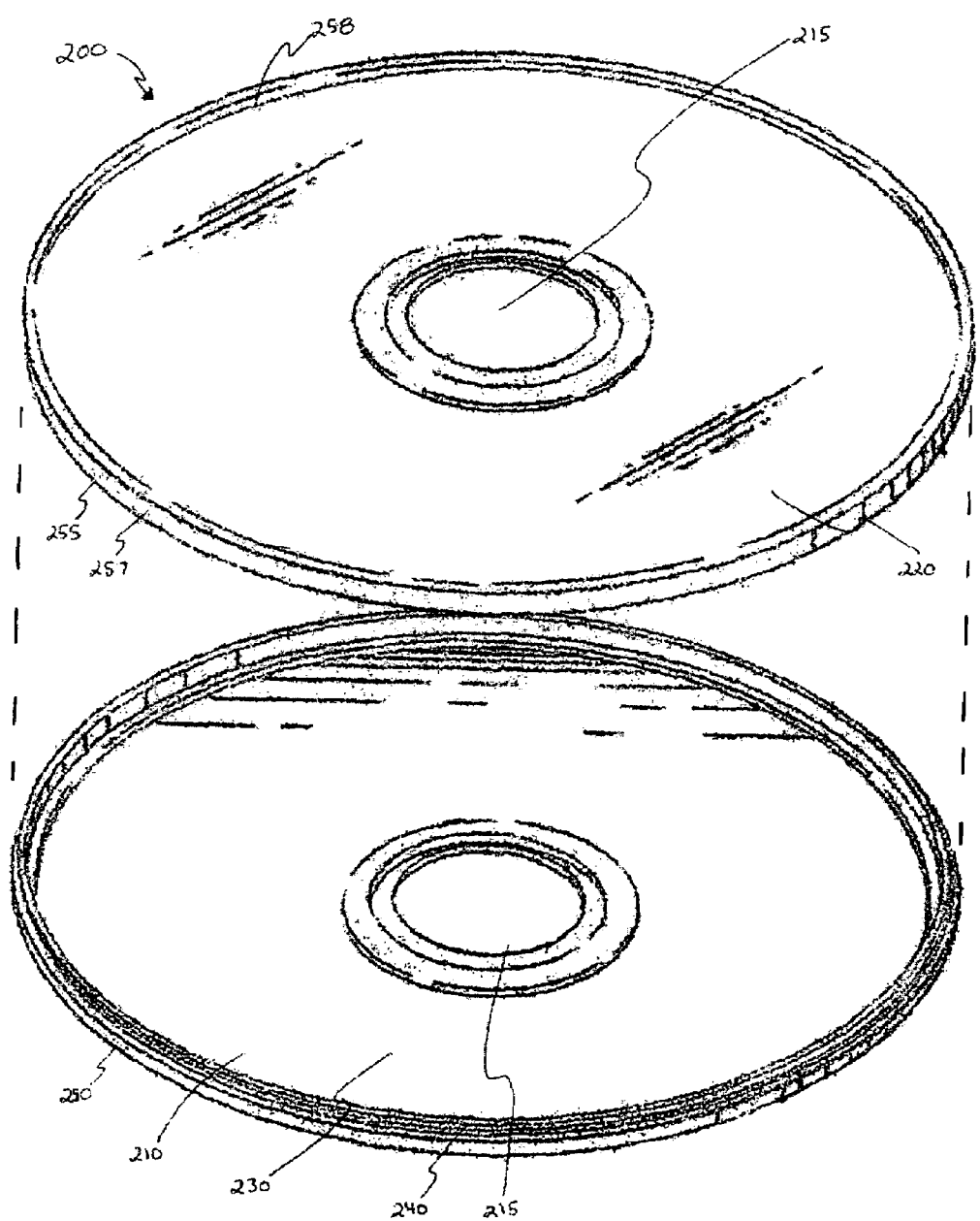
FIG. 3 is an exploded perspective view of a two-sided embodiment of the present invention.

Referring to FIGS. 3 and 4, there is illustrated an alternative embodiment of the present invention. As illustrated, the disc storage case 200, comprises a bottom tray 210 and an upper tray 220, both configured in a substantially planar manner and circular in shape. The bottom tray 210 and the upper tray 220 both have a diameter generally 0.04 inches greater than the diameter of a standard CD/DVD. Both the bottom tray 210 and the upper tray 220 are approximately 0.02 inches in thickness. Those skilled in the art will recognized that numerous other selections could be made for the thickness of the upper tray 220 and the bottom tray 210 to achieve the functionality suggested herein. As previously referenced herein, the bottom tray 210 should be manufactured from a durable material such as but not limited to plastic that has no diffraction properties for wavelengths between 600-800 nm to prevent interfering with the laser used in standard CD/DVD players.

The disc storage case 200 has a first position and a second position with the first position illustrated in FIG. 3 in the drawings submitted herewith. In the first position the upper tray 220 and the bottom tray 210 are disengaged allowing the user to place a disc on the bottom tray. Once a disc is placed on the bottom tray 210 the disc storage case 200 is placed in its second position by releasably securing the upper tray 220 to the bottom tray 210, as shown in FIG. 4.

The bottom tray 210 has a disc resting area 230. The disc resting area 230 extends inwardly to a central opening 215. The central opening 215 has an approximate diameter of 1 inch, which prevents the central opening 230 from interfering with the engagement of the disc 205 with a standard hub mechanism on a CD/DVD player or a typical jewel storage case. A standard disc 205 of conventional construction typically has an information containing area and an adjacent non-information containing area along the outer edge 207 of the disc 205.

Still referring to FIGS. 3 and 4, circumferentially disposed along the peripheral edge 250 of the bottom tray 210 and contiguously formed therewith is an outer wall 240. The outer wall 240 is generally perpendicular and extends upwardly from the bottom tray 210. Although no specific measurements are required, good results have been shown to be achieved with an outer wall 240 that is approximately 0.02 inches in thickness. The portion of the outer wall 240 positioned distally from the bottom tray 210 is integrally formed therewith a generally concave shaped snap groove 270. The snap groove 270 is formed on the outer wall 240 positioned opposite to the disc resting area 230. The snap groove 270 protrudes slightly inward from the top edge 204 of the outer wall 240 and is configured to mate with the snap tongue 265. Adjacent to the outer wall 240 and superposed on the bottom tray 210 is a lower retaining flange 290. The lower retaining flange 290 is entirely contiguously mounted along the inner circumference of the outer wall 240. As referenced herein, no specific measurements are required but good results have been achieved with a lower retaining flange 290 approximately 0.005 inches in thickness. The lower retaining flange 290 is designed to engage the outer edge 207 of the disc 205, which is generally a non-information containing area on a conventionally manufactured disc 205. Upon engagement with the lower retaining flange 290 the disc 205 and the disc resting area 230 form a lower void 280. The lower void 280 is impervious to dust and debris which facilitates the protection of the information containing or optical side of the disc 205.

Referring in particular to FIG. 4, a downwardly extending circular ridge 295 is formed on the under surface of the bottom tray 210. The circular ridge is mounted circumferentially about the central opening. The circular ridge 295 allows the disc storage case 200 to readily engage with a standard tray of a jewel case or a CD/DVD player. The circular ridge 295 downwardly biases the disc storage case 200 when it is engaged with a standard tray of a jewel case or CD/DVD player.

Now referring to FIG. 3, the upper tray 220 is manufactured from a durable and lightweight material. More specifically but not by way of limitation plastic. Integrally formed with the upper tray 220 and generally proximate to the upper peripheral edge 255 is the upper outer wall 257. The upper outer wall 257 extends perpendicularly downward from the upper tray 220. An upper retaining flange 285 is located adjacent to the upper outer wall 257 and contiguously mounted with the disc-facing surface 288 of the upper tray 220. The upper retaining flange 285 will downwardly bias a disc 205 against the lower retaining flange 290 when the disc storage case 200 is in the second position. Positioned on the upper outer wall 257 opposite the interior facing surface 258 generally protruding inward is a snap tongue 265. The snap tongue 265 is proximate to the lower edge 282 of the upper outer wall 257. The snap tongue 265 is generally convex in shape and is of specific shape to mate with the snap groove 270. When the user places the upper tray 220 and the bottom tray 210 together, the two trays are releasably secured with the snap groove 270 and the snap tongue 265 biasing the upper outer wall 257 and the outer wall 240 in a generally lateral direction. It is contemplated within the scope of the present invention that many different types of securing mechanisms could be used in place of and or in conjunction with the snap groove 270 and the snap tongue 265. More specifically but not by way of limitation, the disc storage case 200 could be secured together with threads.

Extending downward from the underside of the upper tray 220 located proximate to and encircling the central opening 215 is a biasing ridge 293. Although no specific measurements are required, good results have been shown to be achieved with a biasing ridge 293 that extends downwardly for approximately 0.01 inches. The upper ridge 293 downwardly biases the disc 205 against the lower retaining flanges 290 when the upper tray 220 is releasably secured to the bottom tray 210. In the downwardly biased position the outer edge 207 contacts the lower retaining flange 290 creating a lower void 280. The lower void 280 is completely impervious to dust and debris thus protecting the information containing area of the disc 205.

Referring in particular to the drawings submitted herewith, more specifically FIG. 1, a description of the operation of the disc storage case 100 is as follows.

In use, a user will place a disc on the disc resting surface 20 of the bottom tray 10. The user will exert a slight downward force in the general region of the central opening 30 to engage the outer edge 110 of the disc with the lower retaining flange 80. The upper retaining flange 70 will exert a continuous downward bias on the disc thereby forcing the outer edge 110 of the disc to maintain contact with the lower retaining flange 80. This prevents dust and debris from contacting the information containing area of the disc. Once the disc is engaged in the disc storage case 100 the user can place disc storage case 100 in a desired CD/DVD player and activate the player. Once the user no longer desires to use the player or the disc encased in the disc storage case 100, the user removes the disc storage case 100 with the disc encased therein and can store in a standard jewel case or store without the aid of any additional protection required for the disc in a suitable location.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An optical disc holder comprising:
    a bottom tray, said bottom tray configured in a substantially planar manner and said bottom tray circular in shape, said bottom tray having a disc resting surface of sufficient size to receive an optical disc thereon; said bottom tray is manufactured of plastic possessing no diffraction properties in the range of 600-800 nm;
    an opening, said opening being centrally located in said bottom tray, and;
    an outer wall, said outer wall contiguously mounted to said bottom tray along a peripheral edge, said outer wall being generally perpendicular to said bottom tray;
    a concave shaped snap groove formed in the outer wall opposite the disk resting surface and protruding slightly inward from a top edge;
    a snap tongue operable to mate with the snap groove;
    including an upper retaining flange, said upper retaining flange contiguous with said outer wall, said upper retaining flange being located distally to said bottom tray and generally protruding inward toward said opening, said upper retaining flange for biasing in a downwardly direction an inserted optical disc;
    a lower retaining flange, said lower retaining flange positioned opposite to said upper retaining flange adjacent to said outer wall and superposed on said bottom tray adjacent to said disc resting surface, said lower retaining flange for engagement with the outer edge of said inserted disc;
    a lower void; said lower void impervious to dust and debris when the disc is engaged with the retaining flange and the disc resting surface.

2. The disc holder as recited in claim 1, and further including a circular ridge, said circular ridge contiguous to said bottom tray opposite said disc resting surface, said circular ridge disposed about said opening and extending downwardly from said bottom tray.

3. The disc holder as recited in claim 2, wherein said bottom tray is manufactured from a plastic possessing no diffraction properties for wavelengths between 600-800 nm.

4. The disc holder as recited in claim 2, wherein said bottom tray is 0.02 inches thick.

5. The disc holder as recited in claim 4, wherein said central opening is 1 inch in diameter.

6. The disc holder as recited in claim 5, wherein said lower retaining flange is 0.005 inches in width and 0.005 inches in height.

7. A disc holder comprising:
a bottom tray, said bottom tray circular in shape and having a disc resting surface of sufficient size to receive a disc; said bottom tray is manufactured of plastic possessing no diffraction properties in the range of 600-800 nm;
an upper tray, said upper tray circular in shape, said upper tray being configured to connect with said bottom tray;
a central opening, said central opening being located in the midpoint of said bottom tray;
an outer wall, said outer wall extending upward disposed on the peripheral edge of said bottom tray, said outer wall perpendicular with said bottom tray and being contiguously formed therewith; and
an upper outer wall, said upper outer wall disposed on the upper peripheral edge of said upper tray, said upper outer wall extending downward and perpendicular to said upper tray; and
a lower retaining flange, said lower retaining flange circumferentially disposed and adjacent to said outer wall, said lower retaining flange adjacent to said disc resting surface, said lower flange forming a barrier to dust when an inserted disc is biased thereto.

8. The disc holder as recited in claim 7, and further including, a snap groove, said snap groove contiguous with said outer wall opposite to said disc resting surface of said bottom tray, said snap groove for reliably securing said bottom tray and said upper tray.

9. The disc holder as recited in claim 8, and further including a snap tongue, said snap tongue contiguous with upper outer wall, said snap tongue protruding inward for engagement with said snap groove for releasably securing said upper tray to said lower tray.

10. The disc holder as recited in claim 9, and further including an upper retaining flange, said upper retaining flange circumferentially disposed and adjacent to said upper outer wall, said upper retaining flange superposed on the underside of said upper tray.

11. The disc holder as recited in claim 7, and further including a circular ridge, said circular ridge contiguous to said bottom tray opposite said disc resting surface, said circular ridge extending downward from said bottom tray.

12. The disc holder as recited in claim 11, and further including a biasing ridge, said biasing ridge located about said central opening on the interior facing surface of said upper tray, said biasing ridge extending downward from said interior facing surface.

13. The disc holder as recited in claim 12, wherein said bottom tray and said upper tray are 0.02 inches thick.

14. The disc holder as recited in claim 13, wherein said bottom tray is manufactured of plastic possessing no diffraction properties between 600-800 nm.

* * * * *